US012079115B1

(12) United States Patent
Black et al.

(10) Patent No.: US 12,079,115 B1
(45) Date of Patent: Sep. 3, 2024

(54) SYSTEMS AND METHODS FOR EFFICIENT ACCESS TO DATA

(71) Applicant: United Services Automobile Association (USAA), San Antonio, TX (US)

(72) Inventors: Robert Lee Black, San Antonio, TX (US); Timothy Blair Chalmers, San Antonio, TX (US); Sumita T. Jonak, San Antonio, TX (US); David M. Jones, Jr., San Antonio, TX (US); Gideon Bowie Luck, Wylie, TX (US); Ana Rosa Maldonado, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 94 days.

(21) Appl. No.: 17/690,888

(22) Filed: Mar. 9, 2022

Related U.S. Application Data

(60) Provisional application No. 63/159,322, filed on Mar. 10, 2021.

(51) Int. Cl.
*G06F 11/36* (2006.01)
*G06F 21/62* (2013.01)

(52) U.S. Cl.
CPC ...... *G06F 11/3688* (2013.01); *G06F 11/3684* (2013.01); *G06F 11/3692* (2013.01); *G06F 21/6254* (2013.01)

(58) Field of Classification Search
CPC .............................. G06F 8/20; G06F 11/3688
(Continued)

(56) References Cited

U.S. PATENT DOCUMENTS

| 8,656,134 B2 * | 2/2014 | Gounares | G06F 8/443 |
| | | | 717/136 |
| 8,677,505 B2 * | 3/2014 | Redlich | H04L 9/3271 |
| | | | 715/255 |

(Continued)

OTHER PUBLICATIONS

John Aberdeen et al. "The MITRE Identification Scrubber Toolkit: Design, training, and assessment"; International Journal of Medical Informatics. vol. 79, Issue 12, Dec. 2010, pp. 849-859.*

*Primary Examiner* — Francisco J Aponte
(74) *Attorney, Agent, or Firm* — Fletcher Yoder, PC

(57) ABSTRACT

A system including a development environment data store configured to store development environment data associated with development computer code and a production environment data store configured to store production environment data pertaining to one or more electronic services. The system includes a scenario builder computer is configured to identify one or more scenario parameters relevant to the development computer code, the one or more scenario parameters comprising less than a full set of available scenario parameters and provides the one or more scenario parameters to a scrubber computer. The scrubber computer is configured to receive the one or more scenario parameters and, based upon the one or more scenario parameters, gather a subset of the production environment data, the subset of the production environment data comprising less than a full amount of the production environment data, generate a scrubbed dataset by anonymizing the subset of the production environment data, and provide development environment access to the scrubbed data set.

16 Claims, 6 Drawing Sheets

(58) Field of Classification Search
USPC ......................................................... 717/124
See application file for complete search history.

(56) References Cited

U.S. PATENT DOCUMENTS

| | | | | |
|---|---|---|---|---|
| 8,862,999 | B2 * | 10/2014 | Gupta | G06F 16/254 |
| | | | | 715/764 |
| 9,223,824 | B1 * | 12/2015 | Middleman | G06F 21/6254 |
| 10,223,548 | B2 * | 3/2019 | Bilodeau | G06F 16/9535 |
| 10,318,546 | B2 * | 6/2019 | Gupta | G06F 16/27 |
| 10,467,220 | B2 * | 11/2019 | Li | G06F 11/3676 |
| 10,884,903 | B1 * | 1/2021 | Barua | G06F 11/3664 |
| 10,904,291 | B1 * | 1/2021 | Naumann | H04L 63/20 |
| 10,983,903 | B1 * | 4/2021 | Yawalkar | H04L 43/50 |
| 11,354,227 | B2 * | 6/2022 | Lightowler | G06F 21/602 |
| 11,663,204 | B1 * | 5/2023 | Moore | G06N 5/025 |
| | | | | 707/737 |
| 11,941,377 | B2 * | 3/2024 | Sankaran | G06F 9/44526 |
| 2007/0157156 | A1 * | 7/2007 | Meier | G06F 21/554 |
| | | | | 717/101 |
| 2014/0164405 | A1 * | 6/2014 | Tsai | G06F 21/6227 |
| | | | | 707/754 |
| 2015/0143064 | A1 * | 5/2015 | Bhargava | G06F 11/1464 |
| | | | | 711/162 |
| 2017/0323119 | A1 * | 11/2017 | Harp | G06F 21/6254 |
| 2017/0366513 | A1 * | 12/2017 | Kumaran | H04L 63/0421 |
| 2018/0364996 | A1 * | 12/2018 | Anandam | G06F 8/61 |
| 2019/0026460 | A1 * | 1/2019 | Robertson | G06F 21/53 |
| 2021/0279366 | A1 * | 9/2021 | Choudhury | G06F 16/288 |
| 2022/0343020 | A1 * | 10/2022 | Farre Guiu | G06N 3/096 |
| 2023/0011250 | A1 * | 1/2023 | Bussa | G06N 20/00 |
| 2023/0022539 | A1 * | 1/2023 | Jarraya | H04L 63/0407 |
| 2023/0127625 | A1 * | 4/2023 | Miller | H04L 63/0428 |
| | | | | 726/26 |
| 2023/0259654 | A1 * | 8/2023 | Jalal | G06F 21/6254 |
| | | | | 726/26 |
| 2023/0281339 | A1 * | 9/2023 | Chen | G06F 16/256 |
| | | | | 726/27 |

* cited by examiner

SYSTEMS AND METHODS FOR EFFICIENT ACCESS TO DATA

CROSS-REFERENCE TO RELATED APPLICATIONS

This application claims priority to and benefit of U.S. Provisional Patent Application Ser. No. 63/159,322 titled "SYSTEMS AND METHODS FOR EFFICIENT ACCESS TO DATA," filed on Mar. 10, 2021, the entirety of which is incorporated by reference into the present disclosure.

BACKGROUND

The present disclosure relates generally to systems and methods for identifying, obtaining, and/or providing access to production level data in an automated fashion for computer code development and/or code testing purposes.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

When developing for a production environment(s), developers may introduce new code to update applications to work with data representative of data present within the production environment(s). During development and testing processes, Developers may request production data that contains sensitive information that may require authorization to access. This authorization process may require additional time to process, which delays and slows down progress for developers. Additionally, the amount of production level data can be quite vast. Because the production environment often includes a vast amount of data, data transfer and storage capacities in the development environments may not be sufficient for utilizing all production data in the development and testing processes. In such cases, it may be possible to utilize a subset of the production data. However, when such a technique is implemented, important subsets of production data may be missing for use in the development and testing processes. As such, it may be particularly advantageous to provide developers with quick access to production data (or quasi-production data) with reduced access turnaround times and provide pinpointed subsets of this data (e.g., identified as important) to develop and test computer code.

SUMMARY

Described herein are systems and techniques to identify subsets of data for development and testing purposes in a production environment. The data for development and testing purposes is sourced from production data. Developers request particular scenario parameters, which are used to identify a particular subset of the production data, where the subset of production data may include sensitive data. Thus, the production data may be analyzed for the particular subset requested by the developers and the particular subset of data may undergo a process of anonymization to mask or hide the sensitive data before transmission to developers. In some embodiments, particular attributes of the sensitive data may be identified as important to the testing process and those particular attributes of the sensitive data may be preserved. Additionally, subsets of data with particularly unique correlations/attributes may be pinpointed as crucial subsets of data to be provided for development and/or testing purposes.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

Figure 1:
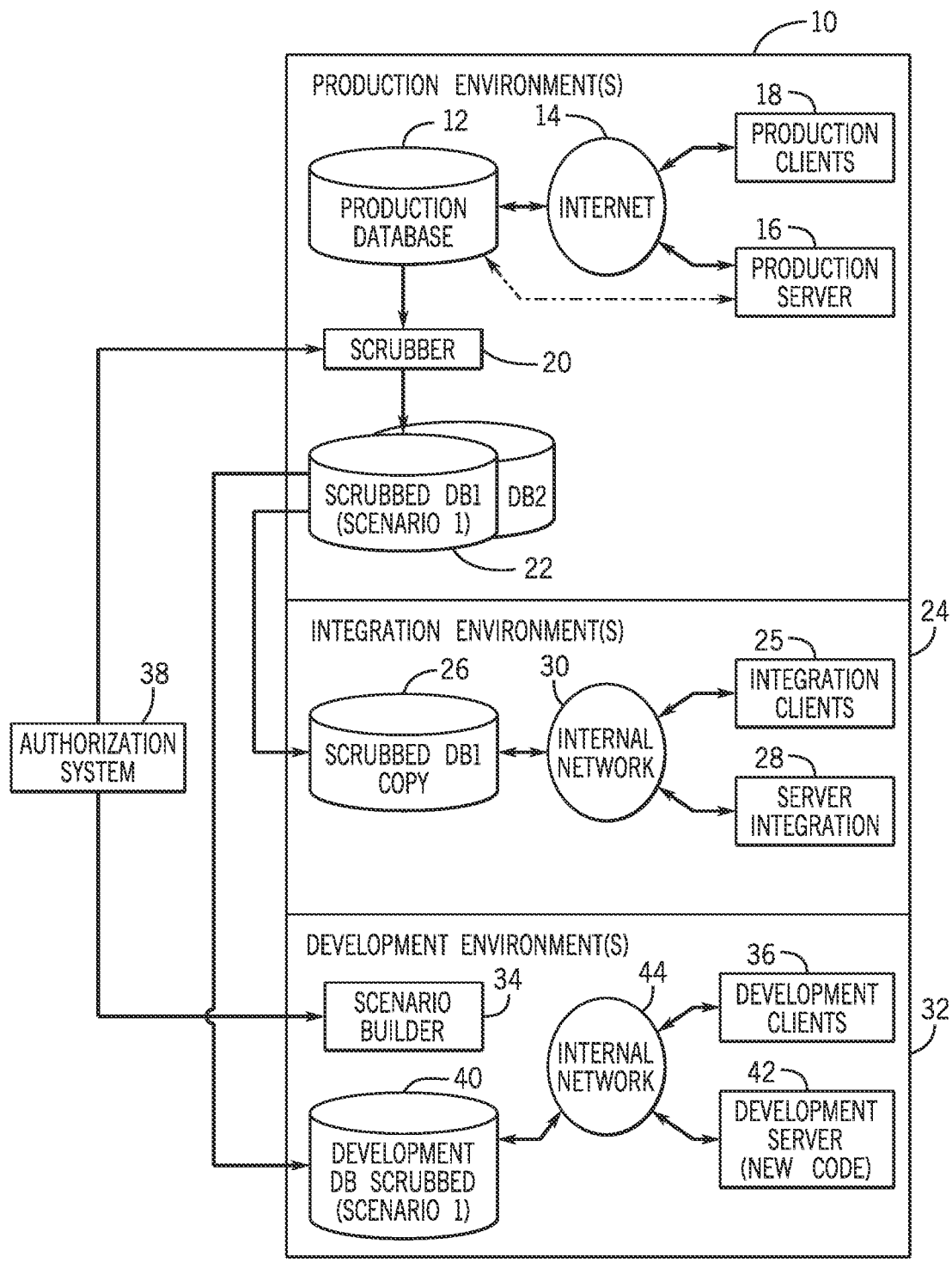
FIG. 1 illustrates an example of a production environment(s), integration environment(s), and development environment(s) employed by an organization that is equipped to provide automated production level sensitive data access, in accordance with an embodiment.

Starting first with a system overview, FIG. 1 illustrates a system that facilitates efficient production data transmission between different environments in the system. For example, the system may include a production environment(s) 10 that may be an environment for facilitating services for clients from a provider, an integration environment(s) 24 that may be an environment for integrating new computer code and services into the production environment(s) 10, and a development environment(s) 32 that may be an environment for developing and testing new code and services to be later integrated into the production environment(s) 10. The production environment(s) 10 may consist of a production database(s) 12 communicatively coupled to the internet 14 (or other network), which may connect the production database(s) 12 with a production server 16 which may provide services for a production client(s) 18 who may utilize the services that may be provided by the production server 16. In some embodiments, the production database(s) 12 may utilize ethernet, a WiFi connection, and/or a local network connection. The production database(s) 12 may contain data relating to the production client(s) 18 and/or users of the production client(s) 18 that may be utilizing the services provided by the production server 16. This data may be referred to as production data. The production level data stored within the production database(s) 12 may contain sensitive information that may require authorization to access. In certain embodiments, production client(s) 18 may access the production data, which may contain the production client's 18 personal information, after an authorization process performed by the production server 16. By way of example, a particular production client(s) 18 may use the production server 16 and production database(s) 12 to access the banking details of the particular production client(s) 18.

The production database(s) 12, as a result of the multitude of different services that may be provided by the production server 16 and the sheer number of production client(s) 18 that may utilize these services, may contain an enormous amount of data. Additionally, the data stored within the production database(s) 12 may contain sensitive information related to the production client(s). For example, the sensitive data stored within the production database(s) 12 may include financial information, such as: credit score information, employment status, income information, monetary balances, and identifying information, such as: social security numbers, driver's license information, state ID information, passport information, birth certificate information, current and/or previous addresses, health insurance information, property owner or renter information, etc.

By way of example, the production environment 10 may be related to a banking system, where the production server 16 may provide various banking services to the production client(s) 18. The production client(s) 18 utilizing the banking system may be utilizing the banking system to store monetary funds, take out loans, set up credit cards, or other general banking functions. This example is non-limiting and production client(s) 18 may utilize the production server 16 for a wide variety of services as discussed above.

As mentioned above, prior to new services and/or products being introduced into the production environment 10, these new services and/or products may be developed and/or tested in the development environment 32 and/or the integration environment 24. For development and/or testing purposes, it may be desirable to utilize production data of the production environment, to more closely understand how the new services and/or products will respond to actual production data. In accordance with some embodiments, a scenario builder 34 may be used to identify particular scenarios/scenario parameters to capture from production data. For example, the scenario builder 34 may include a graphical user interface (GUI) that may enable an operator to input key factors of interest for developing and/or testing the new services and/or products. This will be discussed in more detail with respect to FIG. 5. The inputs of the scenario builder 34 may be analyzed to identify particular production data to obtain to satisfy the requested scenario indicated by the inputs.

In some instances, particular scenario features may be identified based upon a computer code analysis of the new services and/or products. For example, a reference to the computer code may be input into the scenario builder 34, which may analyze the code for conditional statements or other code branching or code features dependent upon particular portions of environment data. Upon detecting such features in the code, the scenario builder 34 may include a scenario feature indicating that the particular portions of the environment data are important for development and/or testing purposes. For example, the code may include a conditional statement resulting in different code operations based upon the first four digits of a recorded credit card number. Upon identifying this conditional statement and the varied operations, the scenario builder 34 may identify that this is important data to be captured in production data used for development and/or testing purposes.

A scrubber 20 may be communicatively coupled to the production database(s) 12. The scrubber 20 may be a processor(s) that performs data identification and modification utilizing data from the production database(s) 12. The scrubber 20 may receive instructions from the scenario builder 34 within the development environment(s) 32, indicating scenario features in accordance with the inputs to the scenario builder 34. In some embodiments, for each scenario provided to the scrubber 20, the scrubber 20 may duplicate any data that it identifies as pertaining to the scenario and may modify this data for storage in a separate database/datastore. The modifications may include identifying and anonymizing certain features found in the data to reduce sensitivity of the data. The modifications may be implemented with the scenario requirements in mind. For example, returning to the example above where the first four digits of the recorded credit card number were found to be important by the scenario builder 34 and included as a scenario feature, the scrubber may identify the credit card number as sensitive data that should be scrubbed/anonymized.

The modified data may be stored within one or more scrubbed databases 22. In some embodiments, there may be multiple scrubbed databases 22, each corresponding to a particular scenario provided by the scenario builder 34. In other embodiments, there may be a single scrubbed database 22 that holds scrubbed data for each of the scenarios provided by the scenario builder.

As discussed above, the integration environment(s) 24 may be an environment for integrating new code and services into the production environment(s) 10 based on new code from the development environment(s) 32. The integration environment(s) 24 may serve as a second level of testing before a service or other introduction of new code is introduced into the production environment(s) 10. In some embodiments, the integration environment may primarily be accessed by developers and other operators who may assist in the integration of new code into the production environment. The integration environment may include a duplicated scrubbed database 26, which may be a copy of the scrubbed database 22 described above. The integration environment may also include an integration server containing the new code from the development environment(s) 32 that may need to be integrated into the production environment to implement the new services and/or products. Additionally, the integration environment may also include integration clients 25 used to test the new code from the server. The duplicated scrubbed database 26, integration clients, and integration server may be connected through an integration environment specific internal network 30. In some embodiments, this internal network 30 is a local network that may only be accessed by devices connected to the local network. In other embodiments, the internal network 30 may be accessed by anyone with authorization remotely through the network connection to the internet 14.

The integration environment(s) 24 may provide an environment where multiple new services and/or products can be integrated together. Thus, the integration environment may provide an environment to run tests that utilize the multiple different new services and/or products and their interactions with one another. For efficient testing the scrubbed database 26 may include all data from the scrubbed databases 22 associated with scenarios of all the integrated new services and/or products being tested in the integration environment 24.

Furthermore, the development environment(s) 32 may be an environment for developing and testing new code and services to be passed through the integration environment(s) 24 to later be integrated into the production environment(s) 10. The development environment(s) 32 may primarily be accessed by developers and other operators who may facilitate the development of new code and services for the production environment(s) 10. The development environment(s) 32 may include the scenario builder 34 briefly discussed above. The scenario builder 34 may be software executed by a processor(s) and may inputs via rendering a graphical user interface (GUI) that is presented to the developer and/or other authorized operators upon accessing the scenario builder 34. In some embodiments, the scenario builder 34 may be software executed by the processor that is located on the same system as one or more development client(s) 36, which are located within the development environment(s) 32. In other embodiments, the scenario builder 34 may be software executed by a processor located on a different system as the development client(s) 36. As discussed above, in some embodiments, the scenario builder 34 may provide instructions to the scrubber 20 of the production environment(s) 10 to identify and modify sensitive data based on different scenarios generated by the scenario builder 34.

Additionally, in some embodiments, there may be an authorization system 38 that is coupled between the scenario builder 34 and the scrubber 20. The authorization system 38 may be utilized to provide authorization to any scenarios requiring sensitive information. In some embodiments, the authorization system 38 may receive an output of the scenario builder 34 to identify particular production data requested by the scenario indicated in the output. The authorization system 38 may determine whether any of the identified particular production data will require authorization after anonymization/scrubbing by the scrubber 20 and may submit an authorization request (e.g., an IT ticket) to a relevant location (e.g., personnel or IT ticket system). This may be done in parallel with the generation of the scrubber databases 22 for the scenario, enabling efficient authorization requesting and relevant production data gathering for the scenario. Depending on the response to the authorization request, scrubbed production may or may not be provided back to the development environment.

When the authorization is approved or no authorization is required, the development environment(s) 32 may receive a copy of of the scrubbed database 22/scrubbed data associated with the corresponding scenario provided by the scenario builder 34. This data may be stored in a development database(s) 40.

Additionally, the development environment(s) 32 may include a development server 42 that may have new code provided by the developer(s) to be tested. The new code provided by the developer(s) may be submitted by the developer(s) and/or any other authorized operator at any time. In certain embodiments, the new code may only be submitted to the development server 42 when authorization by a lead developer is granted. The new code of the development server 42 may include fixes for errors in services, updated code to change the way the services operate, updated code to change a user interface, new code to create a new service and/or any other change or fix to the pre-existing and/or new service.

As discussed above, the developers may utilize the new code to create changes within the production environment(s) 10 and the services executed on the production server 16 therein. As such, it may be advantageous to retrieve data reflective of the data within the production environment(s) 10 for testing purposes. However, it may prove timely and resource intensive to collect an entire mirrored version of the data utilized within the production environment(s) 10. Additionally, obtaining the data from the production environment(s) may prove difficult with the amount of authorization required to obtain the data. As described above, the scrubber may alleviate these roadblocks by scrubbing the data of the production environment(s) 10 for quick transmission to the development environment(s) 32 for testing. Further, as discussed herein, particular data subsets of the production data may be identified based upon scenarios (e.g., scenario features) provided by the scenario builder 34.

Figure 2:
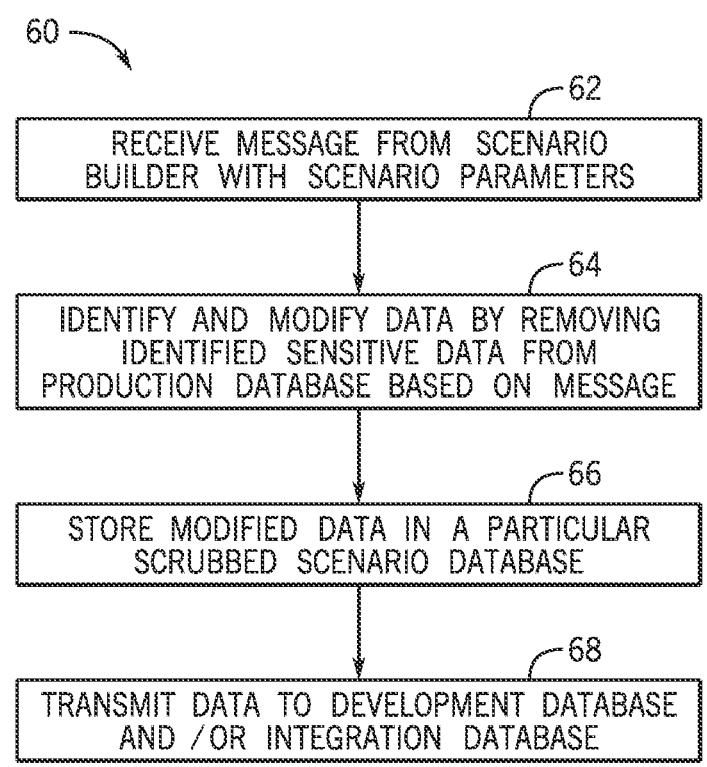
FIG. 2 illustrates a flow chart of a process for identifying, modifying, and storing data for transmission to a database(s) based on scenario parameters, in accordance with an embodiment.

With the foregoing in mind, FIG. 2 illustrates a block diagram of a method 60 for identifying, modifying, and storing data for transmission from a production database/data store. In some embodiments, the method 60 may be performed by the scrubber 20. Alternatively, the method 60 could be performed by any suitable processor. Moreover, although the method 60 is described in a particular order, it should be noted that the method 60 may be performed in any suitable order.

Referring now to FIG. 2, at block 62 the scrubber 20 may receive a message from the scenario builder 34 with scenario parameters. The scenario parameters provided by the scenario builder 34 may reflect data required to test the new code of the development server 42 of FIG. 1. For example, the scenario builder 34 may provide scenario parameters indicating that that a particular portion of a data item is important to the particular code being tested in the development environment (e.g., the first four digits of a sixteen digit credit card, all digits of a social security number of an owner of the credit card, and/or the age of the owner of the credit card).

At block 64, the scrubber 20 may identify and modify a copy of certain production data (e.g., in a scrubbed database) based on the scenario parameters indicated in the message received from the scenario builder 34 in block 62. In certain embodiments, the scrubber 20 may identify data by utilizing the instructions stored with the message from the scenario builder 34. That is, the scrubber 20 may receive parameters that the scrubber 20 utilizes to identify data related to key factors desired by the developers. For example, these key factors may relate to demographical information, types of sensitive data, size of data, type of service, and the like. Further, the scrubber 20 may identify from the identified data whether any sensitive data (e.g., which may be likely to trigger authentication requirements) is found in the identified data. If so, the scrubber 20 may determine whether the sensitive data may be anonymized (e.g., to avoid triggering authentication requirements) while maintaining enough of the identified data to satisfy the scenario features. For example, as mentioned above [four digit CC #example from above].

In certain embodiments, the scrubber 20 may identify data by parsing through all available production databases 12 and searching for data representative of the key factors discussed above. The scrubber 20 may perform an individual search on a single database at a time of the number of all available production databases 12 to identify the data correlated with the key factors. In other embodiments, the scrubber 20 may search all available production databases 12 at the same time to identify the data. It should be acknowledged that the search may occur in any order desired by the developer. The data that is identified by the scrubber may be flagged by the scrubber 20 to aid in modifying the data.

The scrubber 20 may modify the identified data in various ways. In some embodiments, the scrubber 20 may modify the identified data by masking the sensitive data. That is, the scrubber 20 may provide fake numbers and characters to replace the sensitive data. By way of example, the scrubber 20 may replace a social security number and a last name with a fake social security number and a fake last name respectively. In other embodiments, the scrubber 20 may modify identified data by replacing it with a character that is designated to represent replacement characters for any sensitive information. By way of example, the scrubber 20 may replace any sensitive information with a pound sign "#" or any other suitable character. In certain embodiments, the scrubber 20 may remove any sensitive information by deleting it from the identified data.

At block 66, the scrubber 20 may store the modified identified data in a particular scrubbed database 22 associated with a particular scenario. In some embodiments, the scrubbed database 22 may be located within the production environment(s) 10. The scrubber 20 may request for additional scrubbed databases 22 to be available based on the number of scenarios transmitted to the scrubber 20 at block 62. That is, multiple scenarios may be run concurrently and multiple modified data sets may be stored within additional scrubbed databases 22 associated with their corresponding scenarios. The scrubber 20 may identify an amount of memory required to store the modified data set within a different environment and request that the amount of memory be designated for storage prior to transmission.

At block 68, the modified data sets may be transmitted to a duplicate scrubbed database 22(*s*) associated with the corresponding scenario. The duplicate scrubbed database 22 may be within the development environment(s) 32(*s*) and/or the integration environment(s), thus providing these environments with the modified production data subsets identified for the specified scenarios.

As discussed above, the scrubber 20 may identify and modify sensitive data for testing purposes. In some embodiments, the scenario parameters may require that particular sensitive data not be modified for a particular testing purpose. As such, it may be advantageous for the scrubber 20 to communicate to the authorization system 38 to request authorization.

Figure 3:
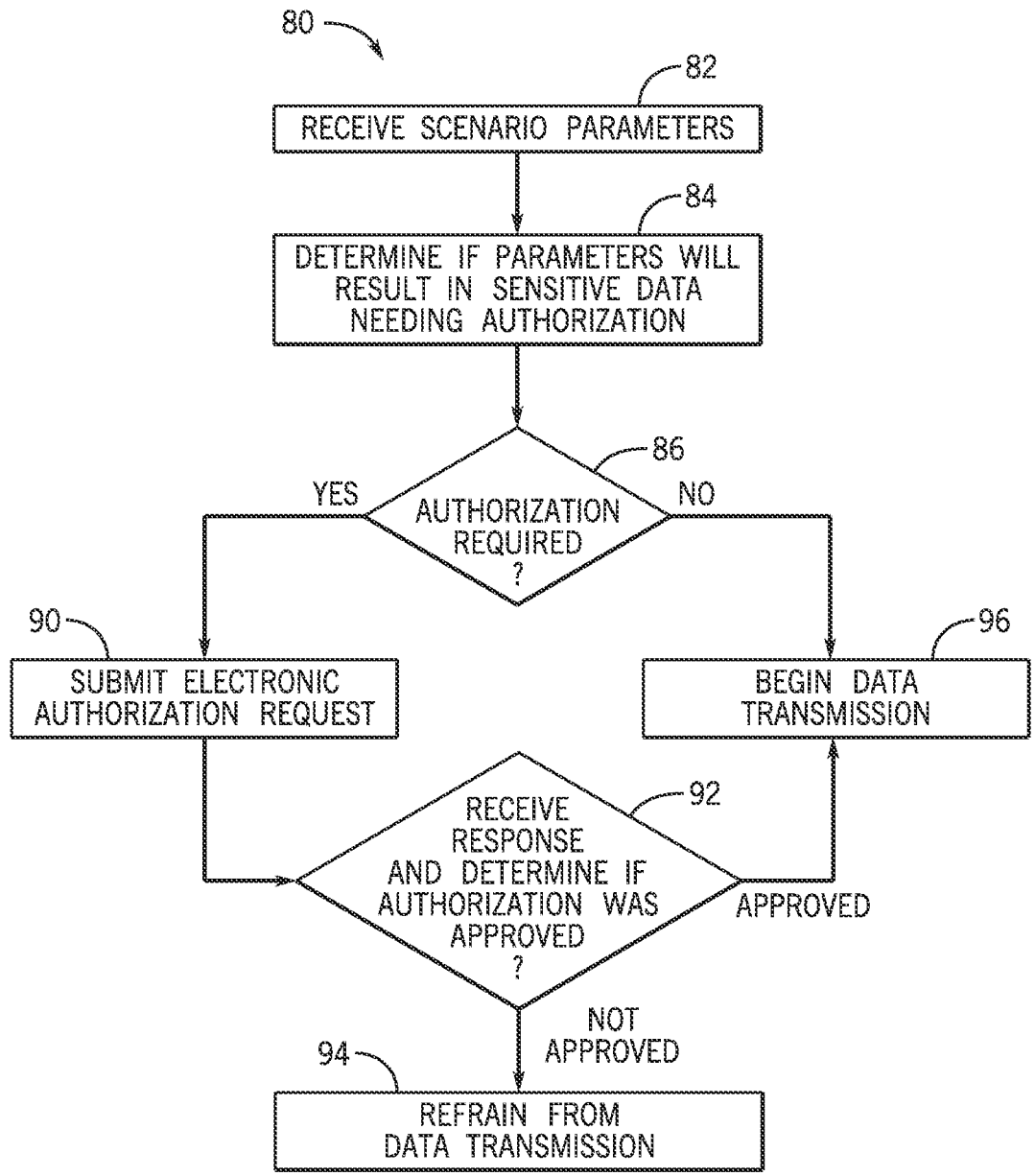
FIG. 3 illustrates a flow chat of a process for automatically submitting authorization requests, when required, to retrieve data from the production database(s), in accordance with an embodiment.

With the foregoing in mind, the scenario builder 34 may send the message through an authorization system 38 before the message is delivered to the processor carrying out the method 80 as described in FIG. 2. The authorization system 38 may receive this message and process it to determine if any action is necessary, as described herein in FIG. 3. Although the following description of the method 80 is described as being performed by the authorization system 38 it should be understood that any suitable processor may perform the method 80. Moreover, although the method 80 is described in a particular order, it should be noted that the method 80 may be performed in any suitable order.

At block 82, the authorization system 38 may receive scenario parameters representative of a particular scenario. In some embodiments, the authorization system 38 may receive the scenario parameters asynchronously or synchronously and may have a timestamp attached to the scenario parameters. In other embodiments, the scenario parameters may indicate that the message containing the scenario parameters may have been previously authorized, thus allowing the scenario parameters to pass through without completely executing method 80.

Next, at block 84, the authorization system 38 may determine if the scenario parameters may result in sensitive data needing authorization. In some embodiments, the scenario parameters may include particular parameters that are checked immediately upon the authorization system 38 receiving the scenario parameters. By way of example, the particular parameters may be related to the sensitive data discussed previously. For example, the sensitive data may be related to a social security, credit score information, current and/or previous address, employment status, income information, monetary balances, driver's license, state ID, passports, birth certificates, health insurance information, owner or rental information, or anything else relating to banking, insurance, and/or healthcare information. That is, when the particular parameter relating to any of the above discussed types of sensitive data is received at block 84, the authorization system 38 may consider the particular parameter first before other parameters are considered.

At decision block 86, the authorization system 38 may decide if the scenario parameters require authorization. If authorization is required, at block 90, the authorization system 38 may submit an electronic request for authorization. In certain embodiments, the authorization system 38 may send the electronic request to the production database(s) 12, which provides authorization. In other embodiments the authorization system 38 may send the electronic request to the production server 16 or a production IT ticket tracking system that alerts particular IT personnel of the request, which provides authorization. The electronic request may be asynchronous or synchronous and may have a timestamp attached to the electronic request.

The electronic request sent by the authorization system 38 may require additional information to receive approval. In some embodiments, the electronic request may include a security attribute provided by the developer associated with the electronic request, information regarding the nature of the data requiring authorization, a purpose for the authorization request being sent, and the type of data being request for authorization. Moreover, the electronic request may include any relevant information pertaining to the security of the data being requested.

At decision block 92, the authorization system 38 may receive a response corresponding to if the electronic request for authorization has been approved or not. The authorization may then determine if the authorization was approved. In some embodiments, the approval for authorization may be provided by the production server 16, while in other embodiments, the production server 16 may provide the approval. The approval response may have a timestamp attached and is asynchronous or synchronous. In the case of the electronic request being denied, at block 94, the authorization system 38 may refrain from transmitting the scenario parameters to the scrubber 20 or may otherwise refrain from providing the scrubbed production data subsets to the development environment. However, if the electronic request for authorization is approved, then at block 96, the authorization system 38 may begin transmitting the scenario parameters to the scrubber 20 and/or enable transmission of scrubbed production data subsets to the development environment. Moreover, at block 84, the scenario parameters may be determined to not require authorization and the authorization system 38 may transmit the scenario parameters to the scrubber 20/permit transmission of scrubbed production data subsets without completing an electronic request.

Figure 4:
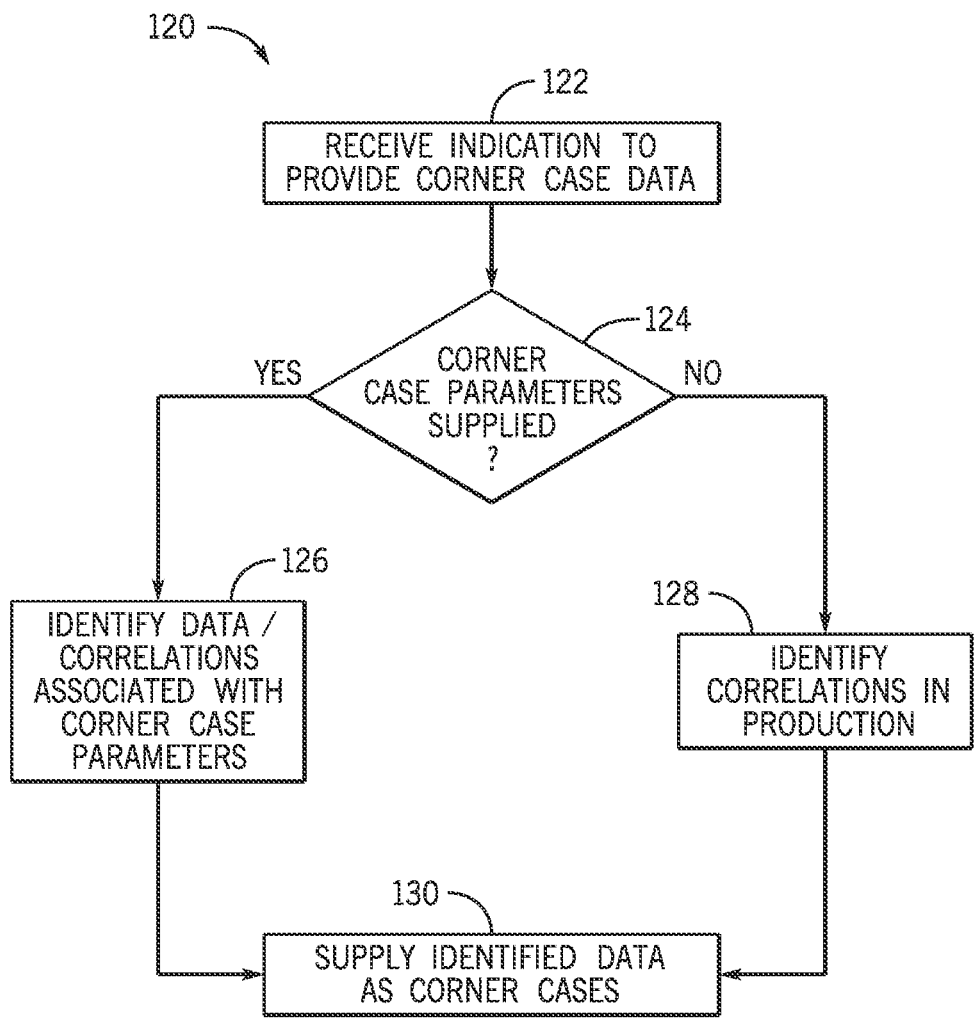
FIG. 4 illustrates a flow chart of a method for identifying and supplying important (e.g., correlation/attribute-specific and/or corner case) data by identifying correlations in data, in accordance with an embodiment.

Turning now to additional desirable production data that may be identified for testing, FIG. 4 illustrates a method 120 where the scenario parameters may include a request to obtain corner case data. That is, the corner case data of the production database(s) 12 may be data identified as particularly unusual yet important to the identified scenario features. Although the following description of the method 120 is described as being performed by the scrubber 20 it should be understood that any suitable processor may perform the method 120. Moreover, although the method 120 is described in a particular order, it should be noted that the method 120 may be performed in any suitable order.

At block 122, the scrubber 20 may receive an indication to provide corner case data. In certain embodiments, this indication may be embedded within the scenario parameters supplied by the scenario builder 34 (e.g., based upon GUI inputs provided by an operator of the scenario builder 34).

The scenario parameters may include directives to identify unusual data from particular production data or to identify unusual data from the totality of the particular production data. Accordingly, at block 124, it may be determined if corner case parameters have additionally been supplied. The corner case parameters may include instructions which instruct the scrubber 20 to search for particular outlier data to determine particular unusual data based on the provided parameters. In some cases, the unusual data may be unusual correlations/combinations of particular data across different scenario features (e.g., specified by the scenario builder 34) or features simply present in the production data (e.g., different data fields of the production data).

By way of example, the corner case parameters may include determining correlations between the age of a particular client using a banking service provided by the production server 16 and whether the particular client is the sole user of the banking service. The production data may indicate that the age of a sole owner of a banking service is 18 or older 90% of the time. Therefore, it may be "unusual" that a sole owner is under 18 years old. Given this unusual statistic, the scrubber 20 may search and identify users under the age of 18 as the sole users of the banking service. This example is non-limiting, and in fact, a wide variety of different correlations may be indicated to be identified based on the different services provided by the production server 16.

Moreover, if the corner case parameters have been supplied, then at block 126, the scrubber 20 may identify unusual data/data correlations in the data specifically associated with these corner case parameters. As discussed above, the correlations in the data may be related to instances of data entries correlated with one another associated with services provided by the production server 16. In some embodiments, identifying the correlations may occur during the block 64 of method 60, before the modified data is stored within the scrubbed database 22. That is, the scrubber 20 may identify correlations in the data during the identification process, before modifications to the data occur. In other embodiments, the scrubber 20 may identify the correlations in the data once the modified data is stored within the scrubbed data database, at block 66.

In certain embodiments, the scrubber 20 may flag and identify any additional correlations in the data that are found during the identification process. The scrubber 20 may identify additional correlations in the data that may not have been present in the corner case parameters and present them as additional correlations in the data not specified within the corner case parameters. Moreover, the corner case parameters may include information relating to allowing the scrubber 20 to carry out the process of identifying and flagging the additional correlations in the data. In some embodiments, the corner case parameters may indicate the scrubber 20 to not carry out this process to reduce computing usage and increase speed and efficiency.

At block 128, when the scrubber 20 does not receive any corner case parameters, the scrubber 20 may identify the unusual data/data correlations across the entirety of the production data or production data subsets identified by the scrubber 20. Identifying the correlations in the data may include identifying data entries that may not correspond with the pattern of data entries of a particular service or a particular client. The correlations in the data identified by the scrubber 20 may be related to edge cases that may provide useful to the developer when developing new code to be tested within the development environment(s) 32 to be integrated into the production environment. In other embodiments, the correlations in the data identified may include any correlations of data between different data entries within the production database(s) 12. That is, the correlations of data may not necessarily relate to edge cases or other unusual combinations of data. In some embodiments, identified correlations outside of normal correlations may relate to the existence or absence of data. In other embodiments, the scrubber may identify particular scenarios and the data associated with these particular scenarios are correlated based on identifiable patterns in the data. By way of example, the scrubber 20 may identify correlations in the data associated with a data entry for the particular client related to the particular client being associated with multiple different car insurance premiums for a single vehicle within a same time frame. This example is non-limiting, and in fact, a wide variety of different correlations may be identified based on the different services provided by the production server 16.

Moreover, the scrubber 20 may view in totality the correlations in the data identified earlier in block 126 and/or block 128 and identify correlations of the different identified correlations of the data. That is, the scrubber 20 may associate one set of correlations with another set of correlations if the data within each correlation is related and if both sets of correlations are outside of normal data correlations. By way of example, a particular data set relating to provided income statements by a set of clients may be correlated with a monetary balance associated with the set of clients. The set of clients may additionally be related to correlated data that is related to health insurance information and premium pricing based on income statements provided by the set of clients. The scrubber 20 may identify that the income statements provided by the set of clients for different services show significant differences, and thus the scrubber 20 may flag the two sets of correlated data and present the two sets of correlated data as one, larger correlated data set. In other embodiments, the scrubber 20 may associate one set of correlations with another set of correlations, where one of the set of correlations is outside of normal data correlations and the other is not outside normal data correlations.

At block 130, the scrubber 20 may supply the identified correlated unusual data sets as corner case data sets to be utilized in testing within the development environment(s) 32(s) and/or the integration environment(s). In certain embodiments, the corner case data sets may be stored within the scrubbed database 22 of the production environment(s) 10, the scrubbed database 22 copy of the integration environment(s), and/or the scrubbed database 22 of the development environment(s) 32(s). The corner case data may be utilized by the development clients and/or integration clients to provide test cases when testing the new code stored within the development server 42 and/or the integration server. Additionally, the corner case data may be utilized by the scenario builder 34 when determining future corner case and/or scenario parameters.

To provide the scrubber 20 with the scenario parameters, the developer may utilize a graphical user interface (GUI) to determine which scenario parameters are to be transmitted. As discussed above, the scenario builder 34 of FIG. 1 may be software and may provide instructions to a processor based on inputs provided through the GUI to determine the scenario parameters for the scrubber 20.

Figure 5:
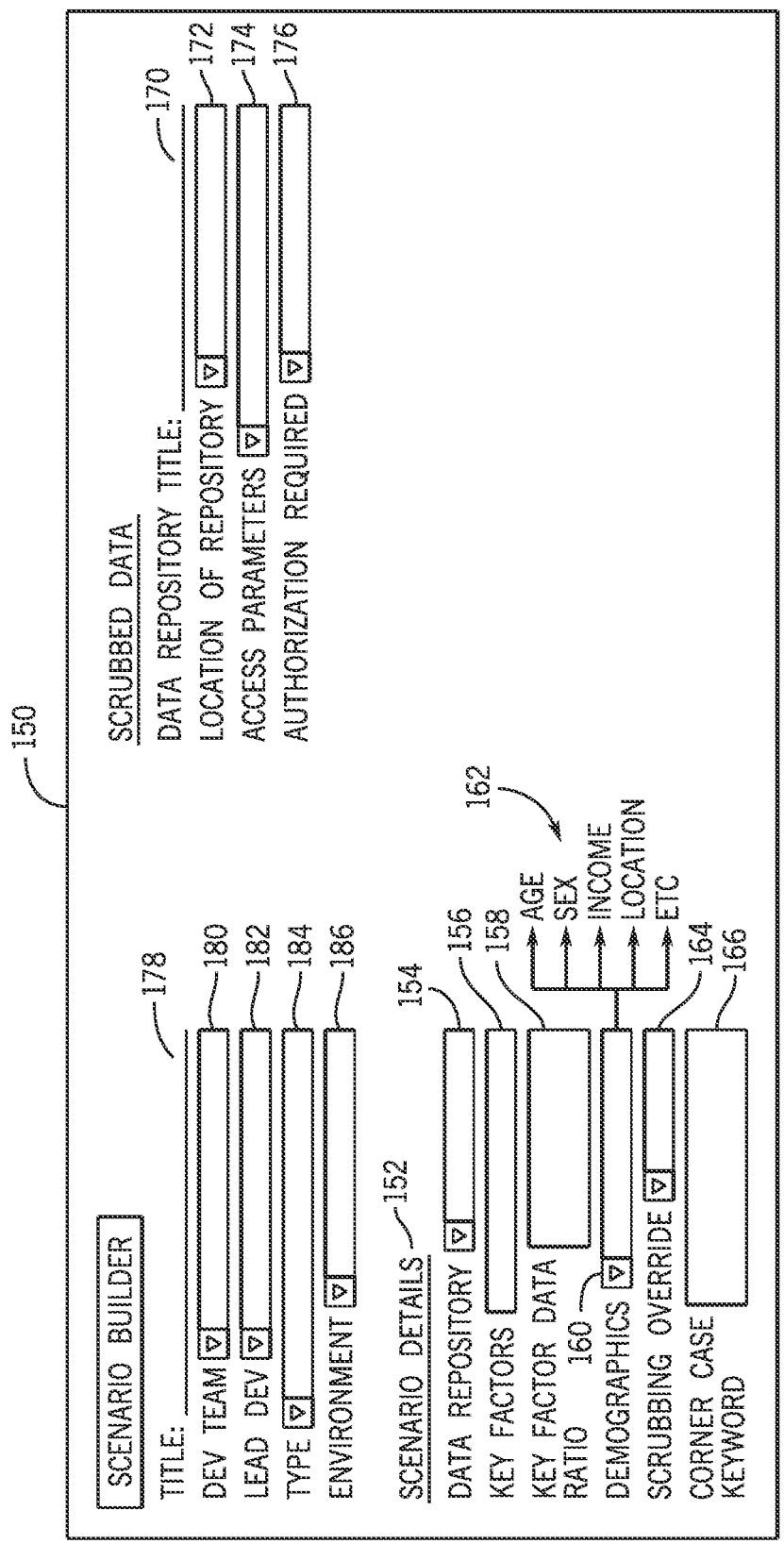
FIG. 5 illustrates an example graphical user interface (GUI) that represents a scenario builder 34 which may provide scenario parameters for a scenario(s), in accordance with an embodiment.

With the foregoing in mind, FIG. 5 illustrates an example of a graphical user interface (GUI) 150 of the scenario builder 34 to facilitate creating scenarios, according to an embodiment. The GUI 150 may include multiple input/selection based and text based graphical interactive elements within the scenario builder 34. To begin, the GUI 150 may include a first menu 152 for scenario parameter selection to determine parameters to be executed by the scrubber 20. In some embodiments, the menu 152 may be labeled as "Scenario Details". For example, the GUI 150 may include selection based interactive elements for "Data Repository" 154, where a particular data repository within the production database(s) 12 relating to one of the services provided by the production server 16 (e.g. banking, health, housing, etc.). In some embodiments, the "Data Repository" 154 may be automatically selected by analyzing the production database(s) 12 based on the inputs and selections discussed below. The data repository indication may allow that scenario builder 34 or the scrubber 20 to analyze the code to identify particular features (e.g., key factors) of interest based upon particular environment data referenced in the code. For example, as mentioned above, when the first four digits of a credit card number is used in a conditional code branch, this may indicate a particular feature of interest to the code and, thus, may be indicated as a scenario feature by the scenario builder 34.

In some embodiments, the user of the GUI 150 may manually indicate key factors. Accordingly, the GUI 150 may also include a text field input element for "Key Factors" 156 and "Key Factor Data Ratio" 158, where the "Key Factors" 156 may be related to the type of non-sensitive and sensitive data (e.g. all the examples of sensitive data discussed above) that is being analyzed and the "Key Factor Data Ratio" 158 may be related to the ratio of a size of the data subset that may be generated in FIG. 2 to a size of real production data in the production database(s) 12. That is, the scenario parameters may include the ratio of these two sets of data to aid in testing new code provided by the development server 42. Additionally, the GUI 150 may include selection based interactive elements for "Demographics" 160, where the selection based interactive element menu may expand into additional demographic selection based interactive elements 162 that may be selected. The additional demographic selection based interactive elements 162 may include age, gender, income level, location, employment status, and the like. The GUI 150 may also include another selection based interactive element "Scrubbing Override" 164, where the selection may include a "Yes" or "No" option to indicate to the scrubber 20 if it needs to mask or remove any sensitive information. Moreover, the GUI 150 may include a text field input element for "Corner Case Keywords" 166, where keywords may be entered for the scrubber 20 to search for when analyzing correlations in the data during corner case analysis and discovery, as discussed in FIG. 4.

Next, the GUI 150 may include a second menu 168 for specifying details for the outputted data from the scrubber 20. In some embodiments, the second menu 168 may be labeled "Scrubbed Data". First, the GUI 150 may include a text field input element "Data Repository Title" 170 to enter a title for the scrubbed data repository. The GUI 150 may include selection based interactive elements for "Location of Repository" 172, "Access Parameters" 174, and "Authorization Required" 176. The "Location of Repository" 172 may include options of different database subsections where the scrubbed database 22 created in FIG. 2 may be located. In some embodiments, the location of the scrubbed database 22 may be automatically chosen based on available space and a most recent scrubbed database 22 repository location. The "Access Parameters" 174 may include options of different levels of access that may be required for access by the developer or someone of equal stature. In some embodiments, the "Access Parameters" 174 may be automatically determined based on the amount and type of sensitive data to be stored within the scrubbed database 22 repository. Finally, the "Authorization Required" 176 may include a "Yes" or "No" option to indicate whether or not utilizing the scrubbed database 22 for testing requires authorization, such as the authorization request of FIG. 3. In some embodiments, the "Authorization Required" 176 elements may be automatically determined based on if "Scrubbing Override" 164 of the "Scenario Details" 152 menu has been selected as "Yes". In other embodiments, if the scrubber 20 was required to send the electronic request of FIG. 3, then the "Authorization Required" 176 field may be filled in automatically as "Yes".

Finally, the GUI 150 may include a text field input element to enter a title for the scenario 178. The GUI 150 may include selection based interactive elements for a "Development Team" 180 and a "Lead Developer" 182, where a development team currently working on a particular scenario and a lead developer leading the development team may be selected from a predefined list already stored within the scenario builder 34. In some embodiments, there selection based interactive element fields may be used as text field input elements to enter in the names of the development team and the lead developer. The GUI 150 may also include selection based interactive elements for "Type of Scenario" 184 and "Environment for Testing" 186, where a type of scenario (e.g. data overflow, sensitive data, stress testing, to be created by the scenario builder 34 and the environment(s) (e.g. development, integration, and/or production environment(s) 10) the scenario will be tested in may be specified. By way of example, the type of scenario and the environment to be tested by the scenario selected may be identifying data overflow within sensitive data fields within the production database(s) 12. In some embodiments, there selection based interactive element fields may be used as text field input elements to enter in a custom type of scenario and a custom environment to be tested if the options are not already listed. An option may appear once text has been entered to save the custom type of scenario and the custom environment for future use by the scenario builder 34.

Through utilization of the scenario builder 34, developers may instruct the scrubber 20 to identify, modify, and store data from the production environment(s) 10 representative of the scenario parameters and corner case parameters. The data obtained by the scrubber 20 may serve to aid in further testing and analysis of vulnerabilities of the production environment(s) 10.

Figure 6:
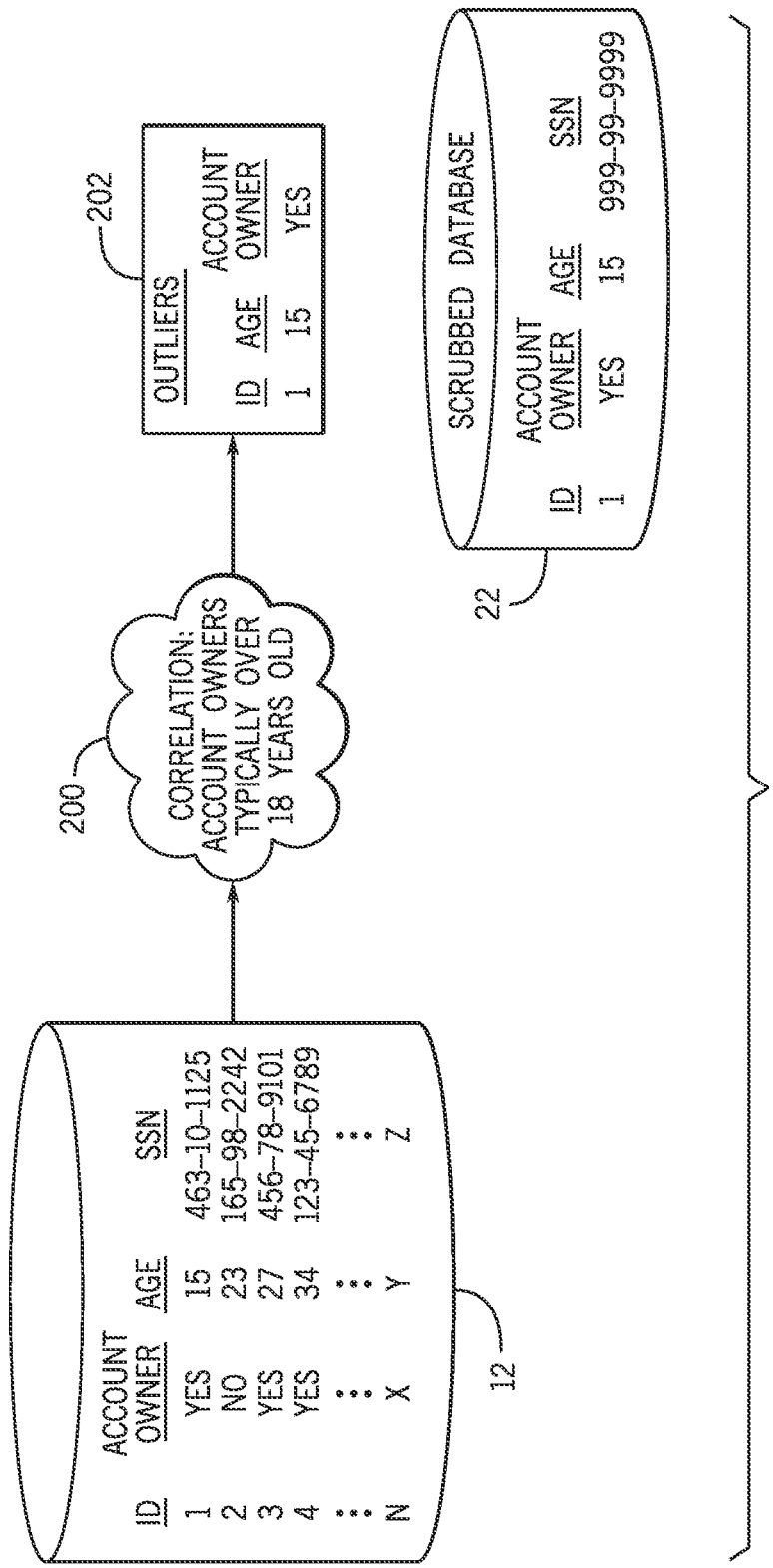
FIG. 6 illustrates an example of a scenario(s) and corner case(s) resulting from the scenario builder of FIG. 5, in accordance with an embodiment.

With all for the foregoing in mind, FIG. 6 illustrates an example scenario and corner case(s) resulting from the scenario builder 34 providing scenario parameters. Once the scenario parameters are processed in FIG. 2, the scrubbed database 22 is created that may include data related to a particular scenario relating to the scenario parameters. In the example of FIG. 6, the scenario parameters may be directed towards collecting the age and social security number of bank account owners. From the data collected during FIG. 2, a correlation may be made that account owners may typically be over the age of 18 if they are the sole owner of the bank account. Correlations 200 in the data may be represented by the collection of account owners who are the only client of the account and the personal information related to these clients. In the scenario parameters of FIG. 6, it was indicated that corner case data relating to sole bank account owners who age falls under 18 may be collected and correlated. Thus, as seen in the corner case window 202, records associated with owners of a bank account that are under the age of 18 may be collected and correlated. Finally, the scrubbed database 22 may be represented by different divisions of the normal correlations in the data and the correlations in the data outside of the normal correlations. For example, the scrubbed database 22 may include one subset of data relating to the collected data based on the scenario, where the collected data may have had the sensitive data scrubbed as described in FIG. 2. In this instance, the social security numbers (or a portion of the social security numbers that do not affect a code branch of the new code) of each data entry may have been changed to represent fake values. In a different subset of the scrubbed database 22, the corner case data may be displayed to show the bank accounts that had the owner under the age of 18.

By employing the techniques described in the present disclosure, the systems and the methods described herein may allow more efficient data access for developers who may require large subsets of data for testing purposes, where the large subsets of data have sensitive aspects requiring authorization that may make testing the data inefficient. The scenario builder 34 may provide the scrubber 20 with scenario parameters to determine the subset of data and the masking of the subset of data's sensitive aspects, while additionally collecting corner case data for testing that may be based on the scenario parameters. Indeed, utilizing the scrubbed database 22 data and the corner case data found from correlations outside of normal correlations in the data to provide developers with efficient data access for testing of new code to be integrated into the production environment may lead to further developments in fixing bugs and errors and upgrading services provided within the production environment.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
a development environment data store configured to store development environment data associated with development computer code;
a production environment data store configured to store production environment data pertaining to one or more electronic services;
a scenario builder computer, configured to:
  identify one or more scenario parameters relevant to the development computer code, the one or more scenario parameters comprising less than a full set of available scenario parameters; and
  provide the one or more scenario parameters;
a scrubber computer, configured to:
  receive the one or more scenario parameters;
  based upon the one or more scenario parameters, gather a subset of the production environment data, the subset of the production environment data comprising less than a full amount of the production environment data;
  generate a scrubbed dataset by anonymizing the subset of the production environment data; and
  provide development environment access to the scrubbed data set; and
an authorization system, configured to:
  receive the one or more scenario parameters;
  identify a subset of the one or more scenario parameters that require authorization for access; and
  request authorization access for the subset of the one or more scenario parameters prior to provision of the development environment access to the scrubbed dataset; wherein the authorization system is configured to request the authorization access by submitting an Information Technology (IT) ticket to an IT ticket management system, the ticket comprising an indication of the request.

2. The system of claim 1, wherein the authorization system is configured to request the authorization access in parallel with the gathering of the subset of the production environment data by the scrubber computer.

3. The system of claim 1, wherein the scenario builder computer is configured to:
provide a graphical user interface (GUI) that provides input affordances for selecting at least a subset of the one or more scenario parameters.

4. The system of claim 3, wherein the GUI is configured to:
receive user input specifying the one or more scenario parameters, wherein the one or more scenario parameters comprise at least one of:
  a data repository identifier, indicative of a location of the production environment data;
  one or more key factors, indicative of a type of nonsensitive and sensitive data of the production environment data;
  a key factor data ratio, indicative of a ratio of a size of the scrubbed data set to a size of the production environment data;
  one or more demographics, indicative of age, gender, income level, location, employment status, or a combination of each;
  a scrubbing override, indicative of masking or removing any sensitive information from the scrubbed data set; and one or more corner case keywords, indicative of particular data correlations in the subset of the production environment data.

5. The system of claim 1, wherein the scenario builder computer is configured to:
   scan the development computer code to identify a code branch that is dependent upon a portion of the production environment data; and
   specify the portion of the production environment data as a key factor of the scenario parameters.

6. The system of claim 1, wherein the scrubber computer is configured to:
   anonymize the subset of the production environment data;
   identify, in the subset of the production environment data, sensitive data;
   determine a retained portion of the sensitive data to be retained based upon the scenario parameters;
   anonymize a remaining portion of the sensitive data that is outside the retained portion of the sensitive data.

7. The system of claim 6, wherein the scrubber computer is configured to anonymize the remaining portion of the sensitive data, by replacing the remaining portion of the sensitive data with different values of a same type.

8. The system of claim 1, wherein the scrubber computer is configured to generate a scrubbed data store for each set of scenario parameters received by the scrubber computer.

9. A computer-implemented method, comprising:
   storing development environment data associated with development computer code;
   storing production environment data pertaining to one or more electronic services;
   identifying one or more scenario parameters relevant to the development computer code, the one or more scenario parameters comprising less than a full set of available scenario parameters;
   based upon the one or more scenario parameters, gathering a subset of the production environment data, the subset of the production environment data comprising less than a full amount of the production environment data;
   generating a scrubbed dataset by anonymizing the subset of the production environment data;
   providing development environment access to the scrubbed data set
   receiving the one or more scenario parameters;
   identifying a subset of the one or more scenario parameters that require authorization for access;
   requesting authorization access for the subset of the one or more scenario parameters prior to provision of the development environment access to the scrubbed dataset; and
   requesting the authorization access by submitting an Information Technology (IT) ticket to an IT ticket management system, the ticket comprising an indication of the request.

10. The computer-implemented method of claim 9, comprising:
    requesting the authorization access in parallel with the gathering of the subset of the production environment data.

11. The computer-implemented method of claim 9, comprising:
    providing a graphical user interface (GUI) that provides input affordances for selecting at least a subset of the one or more scenario parameters;
    wherein the GUI is configured to:
      receive user input specifying the one or more scenario parameters, wherein the one or more scenario parameters comprise:
         a data repository identifier, indicative of a location of the production environment data;
         one or more key factors, indicative of a type of non-sensitive and sensitive data of the production environment data;
         a key factor data ratio, indicative of a ratio of a size of the scrubbed data set to a size of the production environment data;
         one or more demographics, indicative of age, gender, income level, location, employment status, or a combination of each;
         a scrubbing override, indicative of masking or removing any sensitive information from the scrubbed data set;
         one or more corner case keywords, indicative of particular data correlations in the subset of the production environment data;
         or any combination thereof.

12. The computer-implemented method of claim 9, comprising:
    scanning a development computer code to identify a code branch that is dependent upon a portion of the production environment data; and
    specifying the portion of the production environment data as a key factor of the scenario parameters.

13. The computer-implemented method of claim 9, comprising:
    anonymizing the subset of the production environment data;
    identifying, in the subset of the production environment data, sensitive data;
    determining a retained portion of the sensitive data to be retained based upon the scenario parameters; and
    anonymizing a remaining portion of the sensitive data that is outside the retained portion of the sensitive data.

14. The computer-implemented method of claim 13, comprising:
    anonymizing the remaining portion of the sensitive data, by replacing the remaining portion of the sensitive data with different values of a same type.

15. The computer-implemented method of claim 9, comprising:
    generating a scrubbed data store for each set of scenario parameters received.

16. A tangible, non-transitory computer-readable medium, comprising computer-readable instructions that, when executed by one or more processors cause the one or more processors to:
    store development environment data associated with development computer code;
    store production environment data pertaining to one or more electronic services;
    identify one or more scenario parameters relevant to the development computer code, the one or more scenario parameters comprising less than a full set of available scenario parameters;
    based upon the one or more scenario parameters, gather a subset of the production environment data, the subset of the production environment data comprising less than a full amount of the production environment data;
    generate a scrubbed dataset by anonymizing the subset of the production environment data;

provide development environment access to the scrubbed data set
receive the one or more scenario parameters;
identify a subset of the one or more scenario parameters that require authorization for access;
request authorization access for the subset of the one or more scenario parameters prior to provision of the development environment access to the scrubbed dataset; and
request the authorization access by submitting an Information Technology (IT) ticket to an IT ticket management system, the ticket comprising an indication of the request.

* * * * *